US 008612656 B2

(12) United States Patent
Bowles et al.

(10) Patent No.: US 8,612,656 B2
(45) Date of Patent: Dec. 17, 2013

(54) IMPLEMENTING DEVICE PHYSICAL LOCATION IDENTIFICATION IN SERIAL ATTACHED SCSI (SAS) FABRIC USING RESOURCE PATH GROUPS

(75) Inventors: Brian L. Bowles, Rochester, MN (US); Robert E. Galbraith, Rochester, MN (US); Laurel Scaife, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/151,416

(22) Filed: Jun. 2, 2011

(65) Prior Publication Data

US 2012/0311222 A1     Dec. 6, 2012

(51) Int. Cl.
*G06F 13/00* (2006.01)

(52) U.S. Cl.
USPC ............................................ 710/104; 710/316

(58) Field of Classification Search
USPC ................ 710/3, 8–10, 15, 38, 300, 104, 316
See application file for complete search history.

(56) References Cited

U.S. PATENT DOCUMENTS

| | | | |
|---|---|---|---|
| 5,649,108 A * | 7/1997 | Spiegel et al. ................. | 709/241 |
| 7,257,730 B2 | 8/2007 | Spy | |
| 7,853,741 B2 | 12/2010 | Crespi et al. | |
| 2005/0080881 A1* | 4/2005 | Voorhees et al. ............. | 709/220 |
| 2005/0185599 A1* | 8/2005 | Clayton ......................... | 370/254 |
| 2006/0002304 A1* | 1/2006 | Ashwood-Smith ........... | 370/238 |
| 2006/0136688 A1 | 6/2006 | Pang et al. | |
| 2007/0152045 A1* | 7/2007 | Erickson et al. .............. | 235/385 |
| 2008/0165490 A1 | 7/2008 | Buckland et al. | |
| 2009/0006697 A1* | 1/2009 | Doherty et al. ............... | 710/300 |
| 2009/0037565 A1* | 2/2009 | Andresen et al. ............. | 709/222 |
| 2009/0100398 A1* | 4/2009 | Charlebois et al. ............ | 716/18 |
| 2009/0204972 A1* | 8/2009 | Brice et al. ................... | 718/104 |
| 2010/0153639 A1* | 6/2010 | Corry et al. ................... | 711/113 |
| 2011/0051724 A1* | 3/2011 | Scott et al. .................... | 370/389 |
| 2011/0125943 A1* | 5/2011 | Oikawa et al. ................ | 710/106 |
| 2011/0173310 A1* | 7/2011 | Chawla et al. ................ | 709/223 |
| 2011/0219158 A1* | 9/2011 | Davis et al. ................... | 710/300 |
| 2011/0264854 A1* | 10/2011 | Ouchi ........................... | 711/114 |
| 2012/0054396 A1* | 3/2012 | Bhattacharya et al. ....... | 710/300 |
| 2012/0137065 A1* | 5/2012 | Odenwald et al. ............ | 711/114 |
| 2012/0300668 A1* | 11/2012 | Thubert et al. ................ | 370/254 |
| 2013/0070603 A1* | 3/2013 | Sahaly et al. ................. | 370/237 |

OTHER PUBLICATIONS

IBM; "SAS RAID Controllers for IBM i—Power Systems"; publib.boulder.ibm.com/infocenter/powersystems . . . ; Chapter 6, pp. 45-49; Chapter 7, pp. 55-56; 2009.
Liao, H-et al.; "Managing Access Control through SAS Zoning"; pmc.sierra.com/whitepaper-process; citeseerxist.psu.edu/viewdoc/summary..; Sep. 2005.

* cited by examiner

*Primary Examiner* — Thomas J Cleary
(74) *Attorney, Agent, or Firm* — Joan Pennington

(57) ABSTRACT

A method and controller for implementing device physical location identification in a Serial Attached SCSI (SAS) fabric using resource path groups, and a design structure on which the subject controller circuit resides are provided. The device physical location identification includes a Resource Path Group (RPG). Each RPG provides a unique persistent physical locator of a storage device in the system. Each RPG including at least two Resource Paths (RPs) and each RP has a fixed size identifying a type and a series of egress ports. A persistent RPG is stored within the device metadata on the storage device.

21 Claims, 8 Drawing Sheets

320
RESOURCE PATH GROUP

| | | IOA EGRESS PORT | 1ST EXP EGRESS PORT OR DEV NBR OR FF | 2ND EXP EGRESS PORT OR DEV NBR OR FF | 3RD EXP EGRESS PORT OR DEV NBR OR FF | 4TH EXP EGRESS PORT OR DEV NBR OR FF | 5TH EXP EGRESS PORT OR DEV NBR OR FF | 6TH EXP EGRESS PORT OR DEV NBR OR FF |
|---|---|---|---|---|---|---|---|---|
| 300 #1 | TYPE | | | | | | | |
| 300 #2 | TYPE | IOA EGRESS PORT | 1ST EXP EGRESS PORT OR DEV NBR OR FF | 2ND EXP EGRESS PORT OR DEV NBR OR FF | 3RD EXP EGRESS PORT OR DEV NBR OR FF | 4TH EXP EGRESS PORT OR DEV NBR OR FF | 5TH EXP EGRESS PORT OR DEV NBR OR FF | 6TH EXP EGRESS PORT OR DEV NBR OR FF |
| 300 #3 | TYPE | IOA EGRESS PORT | 1ST EXP EGRESS PORT OR DEV NBR OR FF | 2ND EXP EGRESS PORT OR DEV NBR OR FF | 3RD EXP EGRESS PORT OR DEV NBR OR FF | 4TH EXP EGRESS PORT OR DEV NBR OR FF | 5TH EXP EGRESS PORT OR DEV NBR OR FF | 6TH EXP EGRESS PORT OR DEV NBR OR FF |
| 300 #4 | TYPE | IOA EGRESS PORT | 1ST EXP EGRESS PORT OR DEV NBR OR FF | 2ND EXP EGRESS PORT OR DEV NBR OR FF | 3RD EXP EGRESS PORT OR DEV NBR OR FF | 4TH EXP EGRESS PORT OR DEV NBR OR FF | 5TH EXP EGRESS PORT OR DEV NBR OR FF | 6TH EXP EGRESS PORT OR DEV NBR OR FF |

RESOURCE PATH

| BYTE 0<br>302 | BYTE 1<br>304 | BYTE 2<br>306 | BYTE 3<br>308 | BYTE 4<br>310 | BYTE 5<br>312 | BYTE 6<br>314 | BYTE 7<br>316 |
|---|---|---|---|---|---|---|---|
| TYPE | IOA EGRESS PORT | $1^{ST}$ EXP EGRESS PORT OR DEV NBR OR FF | $2^{ND}$ EXP EGRESS PORT OR DEV NBR OR FF | $3^{RD}$ EXP EGRESS PORT OR DEV NBR OR FF | $4^{TH}$ EXP EGRESS PORT OR DEV NBR OR FF | $5^{TH}$ EXP EGRESS PORT OR DEV NBR OR FF | $6^{TH}$ EXP EGRESS PORT OR DEV NBR OR FF |

RESOURCE PATH GROUP

| | | | | | | | |
|---|---|---|---|---|---|---|---|
| 300 #1 | TYPE | IOA EGRESS PORT | $1^{ST}$ EXP EGRESS PORT OR DEV NBR OR FF | $2^{ND}$ EXP EGRESS PORT OR DEV NBR OR FF | $3^{RD}$ EXP EGRESS PORT OR DEV NBR OR FF | $4^{TH}$ EXP EGRESS PORT OR DEV NBR OR FF | $5^{TH}$ EXP EGRESS PORT OR DEV NBR OR FF | $6^{TH}$ EXP EGRESS PORT OR DEV NBR OR FF |
| 300 #2 | TYPE | IOA EGRESS PORT | $1^{ST}$ EXP EGRESS PORT OR DEV NBR OR FF | $2^{ND}$ EXP EGRESS PORT OR DEV NBR OR FF | $3^{RD}$ EXP EGRESS PORT OR DEV NBR OR FF | $4^{TH}$ EXP EGRESS PORT OR DEV NBR OR FF | $5^{TH}$ EXP EGRESS PORT OR DEV NBR OR FF | $6^{TH}$ EXP EGRESS PORT OR DEV NBR OR FF |
| 300 #3 | TYPE | IOA EGRESS PORT | $1^{ST}$ EXP EGRESS PORT OR DEV NBR OR FF | $2^{ND}$ EXP EGRESS PORT OR DEV NBR OR FF | $3^{RD}$ EXP EGRESS PORT OR DEV NBR OR FF | $4^{TH}$ EXP EGRESS PORT OR DEV NBR OR FF | $5^{TH}$ EXP EGRESS PORT OR DEV NBR OR FF | $6^{TH}$ EXP EGRESS PORT OR DEV NBR OR FF |
| 300 #4 | TYPE | IOA EGRESS PORT | $1^{ST}$ EXP EGRESS PORT OR DEV NBR OR FF | $2^{ND}$ EXP EGRESS PORT OR DEV NBR OR FF | $3^{RD}$ EXP EGRESS PORT OR DEV NBR OR FF | $4^{TH}$ EXP EGRESS PORT OR DEV NBR OR FF | $5^{TH}$ EXP EGRESS PORT OR DEV NBR OR FF | $6^{TH}$ EXP EGRESS PORT OR DEV NBR OR FF |

○⌒ CABLE LABEL 336
RP TYPE = 0x80 (FOR DEVICES, (SSDs), MOUNTED ON CARD.
CABLE LABEL MUST AGREE WITH CABLE END CIRCLE VPD)

△⌒ CABLE LABEL 338
RP TYPE = 0x81 (FOR DEVICES, (SSDs), MOUNTED ON CARD.
CABLE LABEL MUST AGREE WITH CABLE END TRIANGLE VPD)

US 8,612,656 B2

IMPLEMENTING DEVICE PHYSICAL LOCATION IDENTIFICATION IN SERIAL ATTACHED SCSI (SAS) FABRIC USING RESOURCE PATH GROUPS

FIELD OF THE INVENTION

The present invention relates generally to the data processing field, and more particularly, relates to a method and controller for implementing a device physical location identification in a Serial Attached SCSI (SAS) fabric using resource path groups, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

Being able to physically identify where a device is located is important when service actions need to be performed on a device. For example, in a redundant array of inexpensive drives (RAID) subsystem where a device failure occurs, it is required to be able to identify the slot where the failed device resides. While it is often possible to use LEDs on the device enclosure to help identify the slot, there are times when the device must be identified by information contained in error logs or information on screens.

The conventional Small Computer Systems Interface (SCSI) storage device interconnect used a parallel set of wires or a bus to connect multiple devices or targets to one or more storage adapters or initiators. Each target or initiator was identified on the bus by a SCSI ID, which could be assigned to each device by the means of switches, jumpers, or a similar mechanism. One mechanism which was commonly used was to have the SCSI ID uniquely assigned to each device, such as a Hard Disk Drive (HDD), by using connections of predefined connector pins on the device, which was be tied electrically High or Low differently for each possible physical location or slot where the device is inserted. In such an implementation, the SCSI ID, along with the SCSI bus number, was commonly used as a way to identify the physical slot where a device was located.

Today SCSI has evolved into SAS (Serial Attached SCSI) and the bus has been transformed into a fabric, which contains not only targets and initiators but also expanders. Expanders are often used to expand or fanout the point-to-point SAS connections to multiple other devices or expanders. For example, a SAS fabric can consist of one or more RAID storage adapters connected to one or more storage devices via one or more expanders. A storage enclosure often contains one or two expanders. These fabric connections are typically used to provide multiple, redundant paths between an initiator and a target.

A need exists for an effective mechanism to identify an enclosure physical slot for each device in a data storage system. Because the type of information which uniquely identifies a device, such as the Serial Number, WWID, and the like, are often not readable on the device label while the device is installed in the device enclosure, a need exists to identify the enclosure slot in some other way.

SUMMARY OF THE INVENTION

Principal aspects of the present invention are to provide a method and controller for implementing a device physical location identification in a Serial Attached SCSI (SAS) fabric using resource path groups, and a design structure on which the subject controller circuit resides. Other important aspects of the present invention are to provide such method, controller, and design structure substantially without negative effects and that overcome many of the disadvantages of prior art arrangements.

In brief, a method and controller for implementing device physical location identification in a Serial Attached SCSI (SAS) fabric using resource path groups, and a design structure on which the subject controller circuit resides are provided. The device physical location identification includes a Resource Path Group (RPG). Each RPG provides a unique persistent physical locator of a storage device in the system. Each RPG including at least two Resource Paths (RPs), and each RP has a fixed size identifying a type and a series of egress ports. A persistent RPG is stored within the device metadata on the storage device.

In accordance with features of the invention, the RP type is based on a cable end vital product data (VPD) label corresponding to the storage device. The cable end vital product data (VPD) label is used to visually identify a storage device.

In accordance with features of the invention, the RPG is changed responsive to the SAS fabric configuration being changed and responsive to the device being physically moved to a different enclosure or slot.

BRIEF DESCRIPTION OF THE DRAWINGS

The present invention together with the above and other objects and advantages may best be understood from the following detailed description of the preferred embodiments of the invention illustrated in the drawings, wherein:

FIG. 3A illustrates an exemplary Resource Path (RP) in accordance with the preferred embodiment;

FIG. 3B illustrates an exemplary Resource Path Group (RPG) in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller implement a device physical location identification in a Serial Attached SCSI (SAS) fabric using resource path groups, and a design structure on which the subject controller circuit resides is provided.

Figure 1:
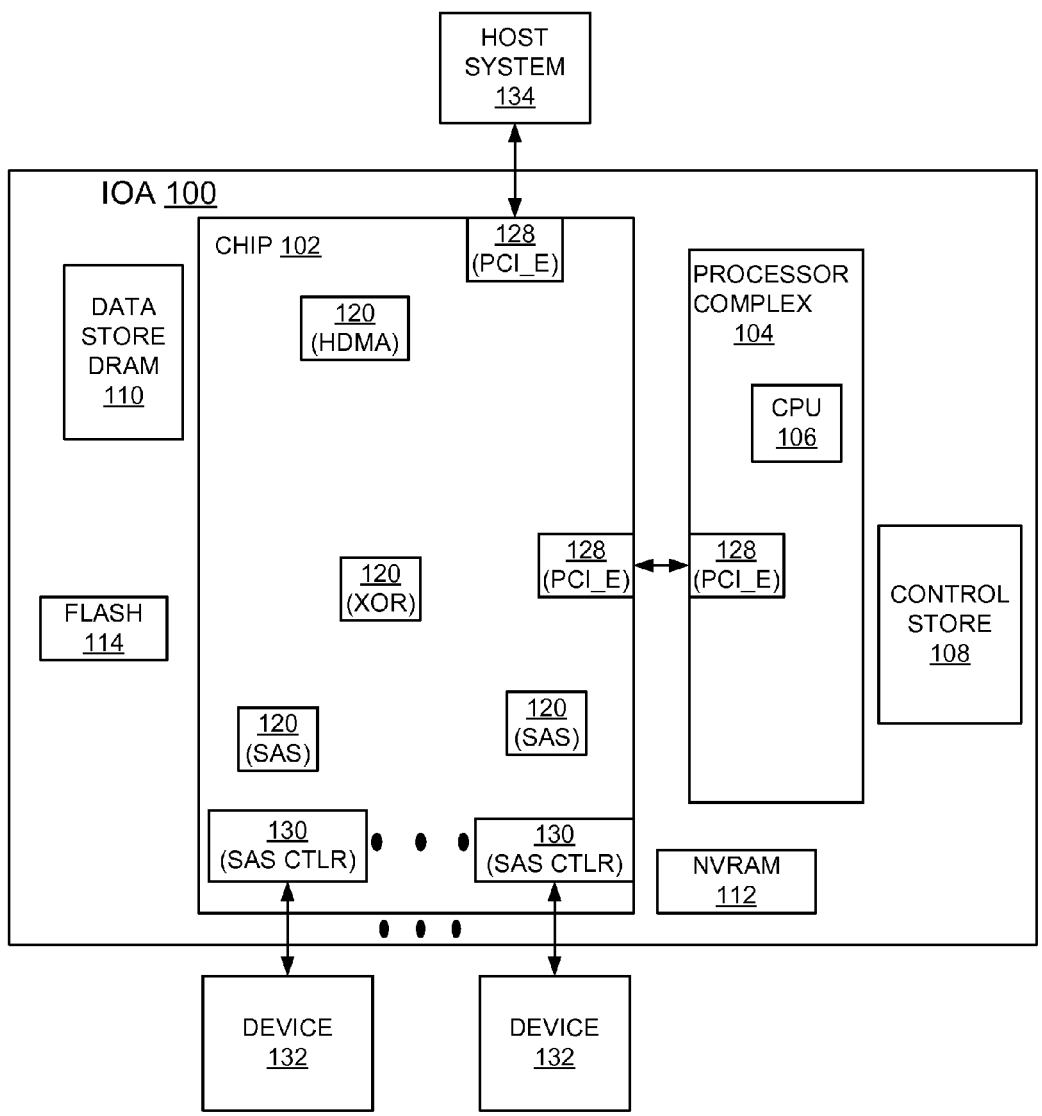
FIG. 1 is a schematic and block diagram illustrating an exemplary system for implementing a device physical location in a Serial Attached SCSI (SAS) fabric using resource path groups in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to a processor complex 104 including a central processor unit (CPU) 106. Controller 100 includes a control store (CS) 108, such as a dynamic random access memory (DRAM) proximate to the CPU 106 providing control storage and a data store (DS) DRAM 110 providing write cache data storage. Controller includes a non-volatile random access memory (NVRAM) 112, and a flash memory 114.

Semiconductor chip 102 includes a plurality of hardware engines 120, such as, a hardware direct memory access (HDMA) engine 120, an XOR or sum of products (SOP) engine 120, and a Serial Attach SCSI (SAS) engine 120. Semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. As shown host system 134 is connected to the controller 100, for example, with a PCIe high speed system interconnect.

Figure 2:
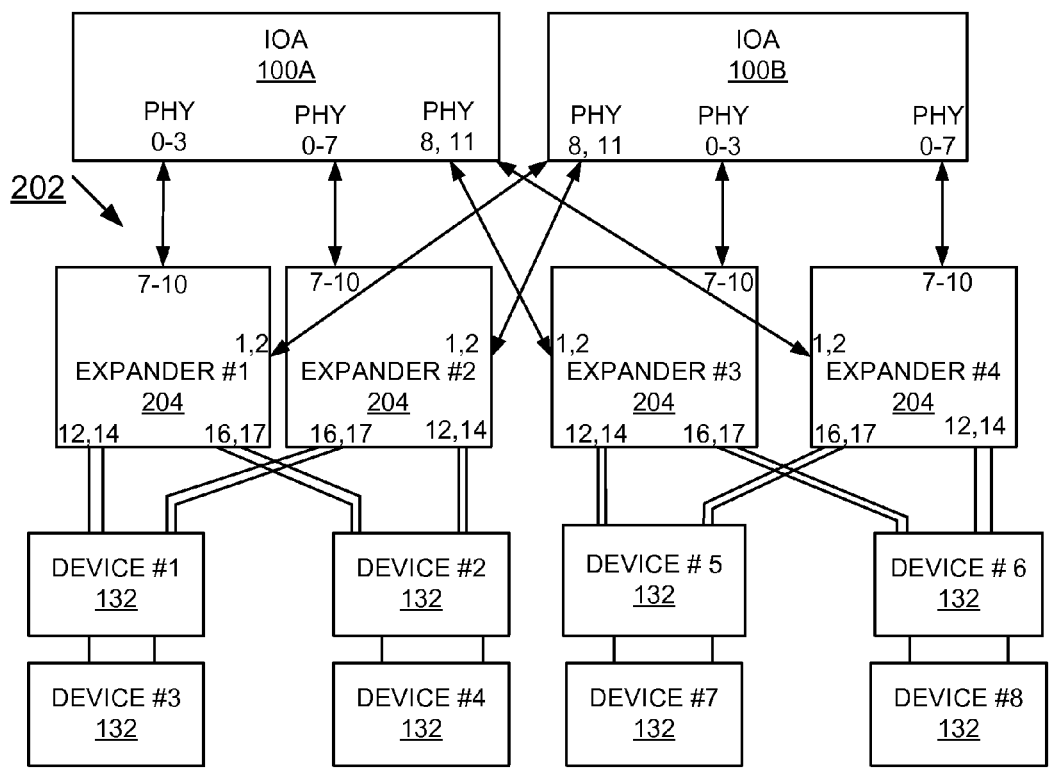
FIG. 2 is a block diagram illustrating an exemplary dual asymmetric controller configuration for implementing a device physical location in a Serial Attached SCSI (SAS) fabric using resource path groups in accordance with the preferred embodiment.

Referring now FIG. 2 there is shown an example dual controller configuration generally designated by the reference character 200 for implementing a device physical location identification in a Serial Attached SCSI (SAS) fabric using resource path groups in accordance with the preferred embodiment. The dual controller configuration 200 includes a SAS fabric generally designated by the reference character 202 connecting a first controller 100A and a second controller 100B to the plurality of storage devices 132, such as hard disk drives (HDDs) or spinning drives 132, and solid state drives (SSDs) 132.

As shown, the SAS fabric 202 includes a pair of expanders 204, #1, 2, and 204, #3, 4 respectively coupled to both controllers 100A, 100B. Expanders, such as expanders 204, #1, 2, and 204, #3, 4, are often used to fanout the point-to-point SAS connections to multiple other devices or expanders. As shown, two pairs of storage devices 132, #1, 2, and #3, 4; and 132, #5, 6, and #7, 8 are coupled to the respective pair of Expanders 204, #1, 2, and 204, #3, 4. The SAS fabric connections provide multiple, redundant paths between an initiator, such as controller 100A, or controller 100B and a target, one of the storage devices 132, #1, 2, and #3, 4; and 132, #5, 6, and #7, 8.

In accordance with features of the invention, identifying a physical location of any of the storage devices, such as storage devices 132, #1, 2, and #3, 4; and 132, #5, 6, and #7, 8, for example, when service actions need to be performed on a particular device, is enabled by a device physical location identification method of the preferred embodiment.

In accordance with features of the invention, device physical location identification is implemented using resource path groups. The resource path groups used to implement device physical location identification for each enclosure physical slot for each device in a data storage system include the following attributes:

1) The identifier is unique for each device which may be serviced.
2) The identifier provides some physical association such that a person can use the identifier to get to a device by following the SAS cables which connect the device enclosure.
3) The identifier is persistent, that is, it must not change with each Initial Program Load (IPL) of the storage subsystem, or when a failure of part of the SAS fabric occurs.
4) The identifier must change when the SAS fabric configuration is changed, and when the device is physically moved to a different enclosure or slot.
5) The identifier must work for both symmetric and asymmetric dual controller configurations.

In accordance with features of the invention, the resource path group provides a persistent physical locator to a host operating system (OS), and resource path groups are effectively used with dual controller configurations with symmetric SAS fabrics, and with dual controller configurations with asymmetric SAS fabrics. The device physical location identification method of the invention using resource path groups effectively determines if a particular associated storage device 132 has moved, and algorithms are provided for adding, removing, updating and replacing the resource path group.

Referring now to FIGS. 3A and 3B, in FIG. 3A there is shown an exemplary Resource Path (RP) generally designated by the reference character 300 in accordance with the preferred embodiment. FIG. 3B illustrates an exemplary Resource Path Group (RPG) generally designated by the reference character 320 in accordance with the preferred embodiment. The RPG 320 includes two or more Resource Paths (RPs) 300, for example, 4 RPs 300, #1-4, as shown in FIG. 3B.

Each RP 300 is fixed size and includes a first byte 0, 302 of Type and a series of bytes including byte 1, 304, byte 2, 306, byte 3, 308, byte 4, 310, byte 5, 312, byte 6, 314, and byte 7, 316, each defining 1-byte Egress Ports, which are terminated with bytes of 0xFF for any unused entries. The series of Egress Ports of each RP 300 describe a SAS path from an initiator, such as controller 100A to a target 132. When there are multiple, redundant paths from an initiator to a target, the RPG 320 contains an RP 300 for each path. Thus, the RPG 300 contains a summary of each SAS path from the initiator, such as controller 100A to a target 132.

In the RPG 320, the first RP entry in a RPG is special in that it is the only RP 300, #1 normally shown to the host OS, for example that is put into error logs or on screens, and must not change while the SAS configuration 202 stays the same and the particular device 132 is not physically moved to a different enclosure or slot. This first RP entry is referred to as the Host RP 300, #1.

In the RPG 320, the remaining RP entries 300, #2-#4 may be reordered, added or removed. Generally speaking, the order of the remaining entries is kept as newest to oldest as the RP entries were discovered. An RP 300 is added if a previously unknown path is discovered and does not already exist in the RPG 320. An RP entry can be removed if a new RP 300 is added and the RPG 320 does not contain enough entries to describe all possible paths.

Two RPGs 320 are considered to be equal if they contain a common member RP 300. This allows for a different number of paths 300 to exist at different times, for example, due to failure of a cable or expander, and the like, while still understanding that the SAS fabric configuration 202 has not changed and the device is still in the same physical slot.

A persistent RPG 320 is stored within the device metadata kept on the storage device 132 itself such that it can be compared at different times, such as when the storage adapter, such as controller 100A or controller 100B is reset, to determine if the device has been physically moved or the SAS configuration changed. When the device 132 is physically moved, for example, then the persistent RPG 320 stored within the device metadata must be replaced to reflect the new paths to the device.

The RPG 320 works for symmetric dual controller configurations, where each storage adapter, such as controller 100A or controller 100B, has the same set of egress ports that is the same paths to each device. Also the RPG 320 works for an asymmetric dual controller configuration, where each storage adapter has a different set of egress ports, providing a different set of paths to each device. The RPG 320 includes features of invention enabling use with the asymmetric dual controller configuration and the symmetric dual controller configurations. The asymmetric dual controller configuration must be a well known SAS configuration, while a symmetric dual controller configuration need not be a well known SAS configuration.

FIG. 2 shows a SAS fabric configuration 202 where, for example, 4 SSD storage devices 132 are mounted on each storage adapter board of an asymmetric dual controller configuration 200 for a total of two controller 100A and controller 100B and 8 SSD devices 132.

Figure 3C:
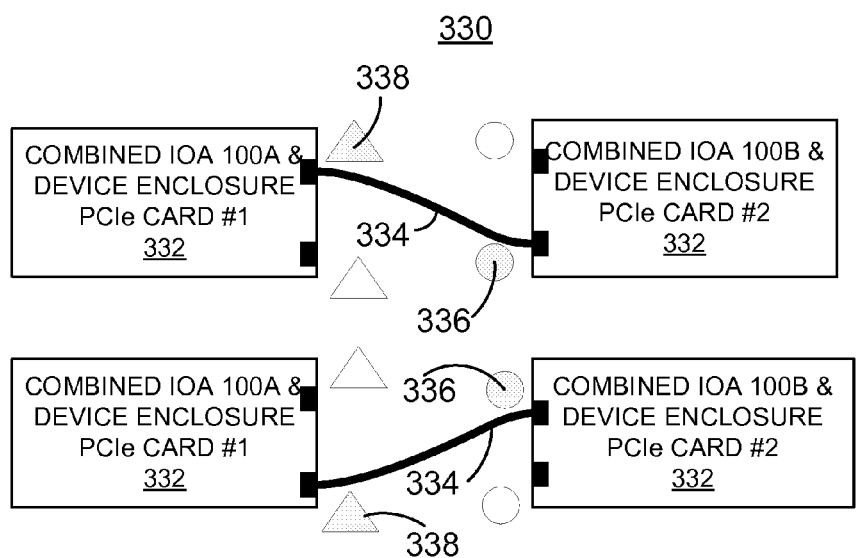
FIG. 3C illustrates exemplary cable end labels and exemplary device Resource Path (RP) types in accordance with the preferred embodiment.

Referring also to FIG. 3C there is shown example cable label arrangement 330, one label which is to be placed on each end of a cable, each depicting how the cable is to be connected between the SAS ports, either top-to-bottom or bottom-to-top, of two combined storage adapter (IOA) 100A, 100B and device enclosure PCIe cards 332, #1, #2. In this arrangement 330, two SAS cables 334 are used to connect the PCIe cards 332, #1, #2 together for redundancy. A respective cable end labels 336, 338 help depict that both "Circle" ends of the cables 334 need to connect to one PCIe card, such as PCIe cards 332, #2 and both Triangle ends of the cables need to connect to the other PCIe card 332, #1. The VPD in the cable ends electronically tell the adapters 100A, 110B which end of the cable 334 is the Circle end 336 and which is the Triangle end 338, and this is used to determine each device's Resource Path (RP) type.

In accordance with features of the invention, the 1-byte Type field 302 of RP 300 of FIG. 3A is used to identify which combined storage adapter and device enclosure is a Circle label 336 with RP Type=0x80 and which is a Triangle label 338 with RP Type=0x81, thus making all the RPs 300 from each storage adapter unique. The special VPD in the cables 334 which attach the two combined storage adapter and device enclosures are used to tell the controller 100A and controller 100B if it is the Circle or Triangle, while the label affixed to each cable end is used to visually identify the PCIe card 332 as the Circle or Triangle, where the Circle label 336 is 0x80 for RP Type 302, and where the Triangle label 338 is 0x81 for RP Type 302 for the RPs 300.

Figure 4:
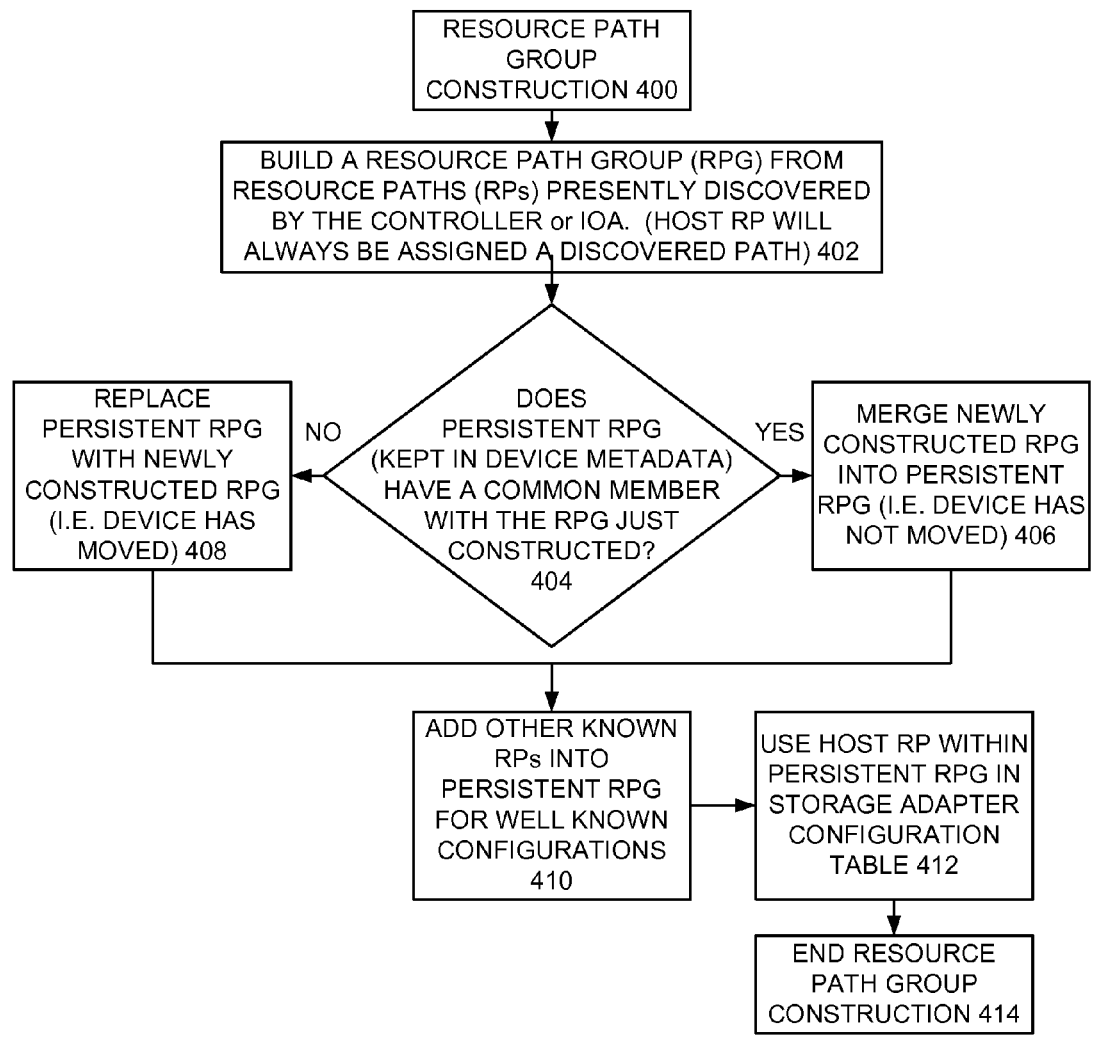
FIGS. 4, 5, and 6 are flowcharts illustrating exemplary operations for implementing a device physical location in a Serial Attached SCSI (SAS) fabric using resource path groups in accordance with the preferred embodiment.
Figure 5:
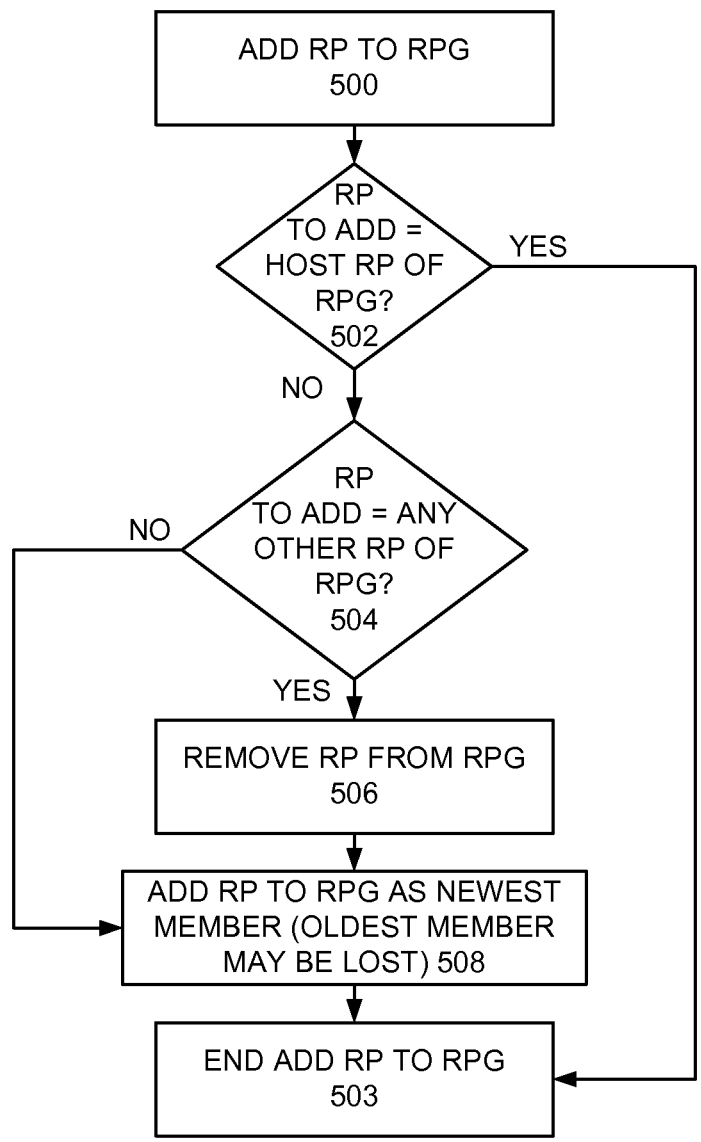
Figure 6:
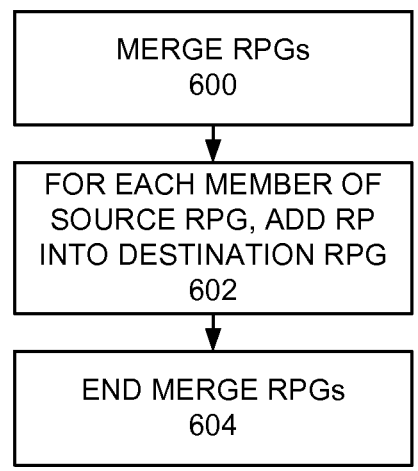

Referring to FIGS. 4, 5, and 6 there are shown exemplary operations for implementing a device physical location in a Serial Attached SCSI (SAS) fabric using resource path groups in accordance with the preferred embodiment.

In FIG. 4, Resource Path Group (RPG) construction begins as indicated at a block 400. A RPG is built from Resource Paths (RPs) presently discovered by the controller or IOA, for example with a reset of the controller 100 or an Initial Program Load (IPL), as indicated at a block 402. The Host RP or the first RP is always assigned a discovered path at block 402. Checking if the persistent RPG stored in the device metadata has a common member with the PRG just constructed is performed as indicated at a decision block 404.

When the persistent RPG stored in the device metadata has a common member with the PRG just constructed, the newly constructed RPG is merged into the persistent RPG, where the device has not moved, as indicated at a block 406. Otherwise, when the persistent RPG stored in the device metadata does not have a common member with the PRG just constructed, the persistent RPG is replaced with the newly constructed RPG, where the device has moved, as indicated at a block 408.

As indicated at a block 410, other known RPs are added into the persistent RPG stored in the device metadata for well known configurations. Host RP or the first RP is used within the persistent RPG in a storage adapter configuration table as indicated at a block 412. The Resource Path Group (RPG) construction ends as indicated at a block 414.

In FIG. 5, operations to add a Resource Path (RP) to a Resource Path Group (RPG) begin as indicated at a block 500. Checking if the RP to add is equal to the Host RP of the RPG is performed as indicated at a decision block 502. If the RP to add is equal to the Host RP of the RPG, the operation end as indicated at a block 503. Otherwise, checking if the RP to add is equal to any other RP of the RPG is performed as indicated at a decision block 504. If the RP to add is equal to any other RP of the RPG, then the RP is removed from the RPG as indicated at a block 506. Otherwise if the RP to add is not equal to any other RP of the RPG, and after the RP is removed from the RPG at block 506, then the RP is added to the RPG as the newest member and the oldest RP member may be lost as indicated at a block 508. Then the operation end as indicated at block 503.

In FIG. 6, operations to merge Resource Path Groups (RPGs) begin as indicated at a block 600. As indicated at a block 602, for each member of source RPG, an RP is added into the destination RPG. Then the merge RPGs operations end as indicated at a block 604.

Figure 7:
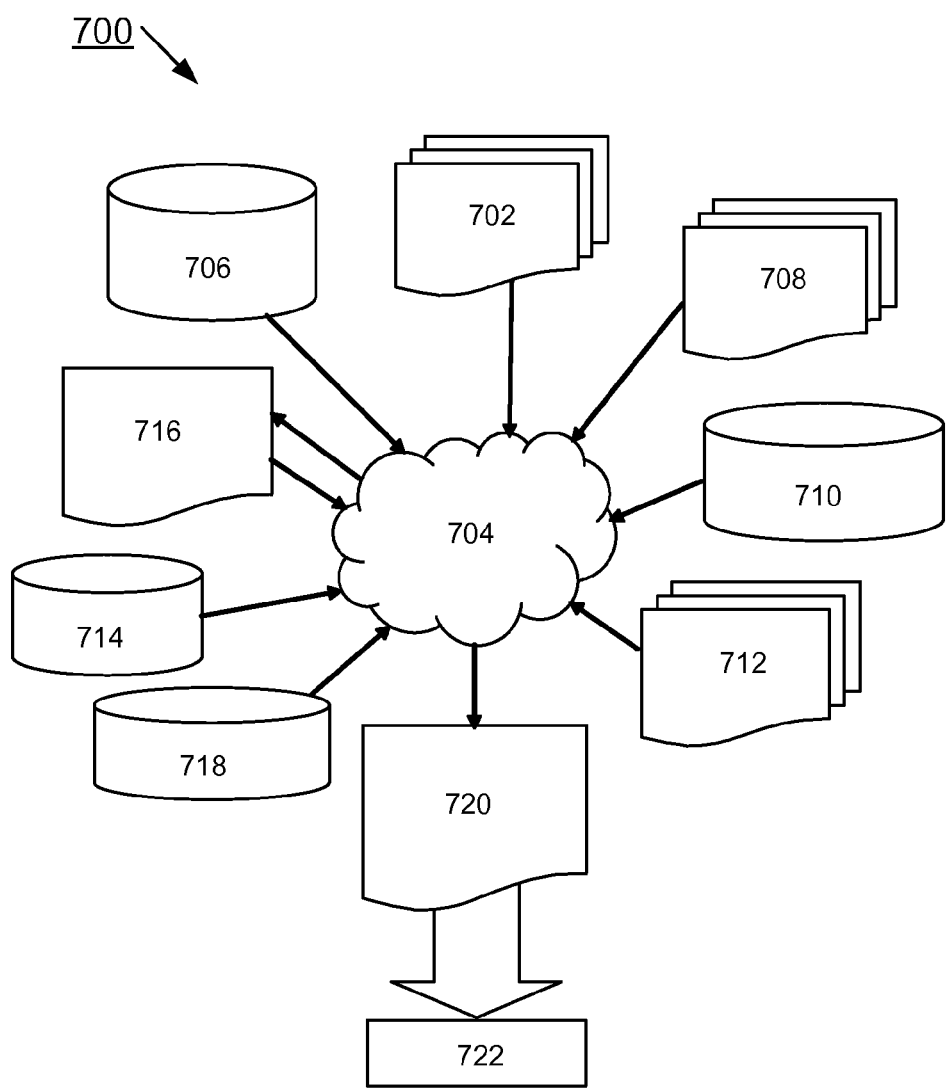
FIG. 7 is a flow diagram of a design process used in semiconductor design, manufacturing, and/or test.

FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 comprises circuits 100, 200, 300, 310, 320 in the form of schematics or HDL, a hardware-description language, for example, Verilog, VHDL, C, and the like. Design structure 702 may be contained on one or more machine readable medium. For example, design structure 702 may be a text file or a graphical representation of circuit 100. Design process 704 preferably synthesizes, or translates, circuits 100, 200,

300, 310, 320 into a netlist 706, where netlist 706 is, for example, a list of wires, transistors, logic gates, control circuits, I/O, models, etc. that describes the connections to other elements and circuits in an integrated circuit design and recorded on at least one of machine readable medium. This may be an iterative process in which netlist 706 is resynthesized one or more times depending on design specifications and parameters for the circuit.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 704 without deviating from the scope and spirit of the invention. The design structure of the invention is not limited to any specific design flow.

Design process 704 preferably translates an embodiment of the invention as shown in FIGS. 1, 2, 3A, 3B, 3C, 4, 5, 6, along with any additional integrated circuit design or data (if applicable), into a second design structure 720. Design structure 720 resides on a storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3A, 3B, 3C, 4, 5, 6. Design structure 720 may then proceed to a stage 722 where, for example, design structure 720 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller for implementing device physical location identification in a Serial Attached SCSI (SAS) fabric in a data storage system; said controller comprising:
said device physical location identification including a Resource Path Group (RPG), said RPG providing a unique persistent physical locator of an enclosure physical slot for a storage device in the data storage system; said RPG including at least two Resource Paths (RPs), each RP being fixed size including a first byte identifying an RP type and a series of bytes defining a series of egress ports and any unused entries; and said first byte identifying said RP type being based upon a cable end vital product data (VPD) label corresponding to the storage device, said cable end VPD label being provided to visually identify a respective storage device, and said first byte identifying said RP type making unique each said RP of the at least two Resource Paths (RPs) from the storage device; and
a persistent RPG being stored within device metadata on the storage device.

2. The data storage system as recited in claim 1 wherein said persistent RPG is changed responsive to the SAS fabric configuration being changed and responsive to the storage device being physically moved to a different one of said enclosure physical slot.

3. The data storage system as recited in claim 2 includes said controller constructing a constructed RPG from at least two Resource Paths (RPs) being discovered for said constructed RPG responsive to a reset of said controller.

4. The data storage system as recited in claim 3 includes said controller comparing said persistent RPG stored within device metadata on the storage device with said constructed RPG to determine if the SAS fabric configuration has changed and if the storage device has physically moved.

5. The data storage system as recited in claim 4 wherein said controller updates said persistent RPG stored within device metadata on the storage device responsive to the compared persistent RPG and said constructed RPG.

6. The data storage system as recited in claim 5 includes said controller adding an RP to said persistent RPG as a newest member of said persistent RPG stored within device metadata on the storage device.

7. The data storage system as recited in claim 1 wherein said cable end vital product data (VPD) label used to visually identify the respective storage device; includes said cable end VPD label being a physical attached to each respective cable connected between SAS ports.

8. The data storage system as recited in claim 7 wherein said RP type is based on said cable end VPD label; and each respective cable having a first cable end VPD label and a different second cable end VPD label provided on opposed ends of each respective cable connected between the SAS ports.

9. A method for implementing device physical location identification in a Serial Attached SCSI (SAS) fabric in a data storage system comprising:
providing a device physical location identification including a Resource Path Group (RPG), said RPG providing a unique persistent physical locator of an enclosure physical slot for a storage device in the data storage system; said RPG including at least two Resource Paths (RPs),
providing each RP with a fixed size including a first byte identifying an RP type and a series of bytes defining a series of egress ports and any unused entries; and said first byte identifying said RP type being based upon a cable end vital product data (VPD) label corresponding to the storage device, said cable end VPD label being provided to visually identify a respective storage device, and said first byte identifying said RP type making unique each said RP of the at least two Resource Paths (RPs) from the storage device; and
storing a persistent RPG within device metadata on the storage device.

10. The method as recited in claim 9 includes changing said RPG responsive to the SAS fabric configuration being changed and changing said RPG responsive to the storage device being physically moved to a different enclosure or slot.

11. The method as recited in claim 10 includes constructing a constructed RPG from at least two Resource Paths (RPs) being discovered for said constructed RPG responsive to a reset of said controller.

12. The method as recited in claim 11 includes comparing said persistent RPG stored within device metadata on the storage device with said constructed RPG to determine if the SAS fabric configuration has changed and if the storage device has physically moved.

13. The method as recited in claim 12 includes updating said persistent RPG stored within device metadata on the storage device responsive to the compared persistent RPG and said constructed RPG.

14. The method as recited in claim 13 includes adding an RP to said RPG as a newest member of said persistent RPG stored within device metadata on the storage device.

15. The method as recited in claim 9 wherein providing said cable end vital product data (VPD) label used to visually identify the respective storage device; includes said cable end VPD label being a physical attached to a respective cable connected between SAS ports.

16. A design structure embodied in a machine readable medium used in a design process, the design structure comprising:
 a controller circuit tangibly embodied in the machine readable medium used in the design process, said controller circuit for implementing device physical location identification in a Serial Attached SCSI (SAS) fabric in a data storage system; said controller circuit comprising:
 said device physical location identification including a Resource Path Group (RPG), said RPG providing a unique persistent physical locator of an enclosure physical slot for a storage device in the system; said RPG including at least two Resource Paths (RPs), each RP being fixed size including a first byte identifying an RP type and a series of bytes defining a series of egress ports and any unused entries; and said first byte identifying said RP type being based upon a cable end vital product data (VPD) label corresponding to the storage device, said cable end VPD label being provided to visually identify a respective storage device, and said first byte identifying said RP type making unique each said RP of the at least two Resource Paths (RPs) from the storage device; and
 a persistent RPG being stored within device metadata on the storage device, wherein the design structure, when read and used in the manufacture of a semiconductor chip produces a chip comprising said controller circuit.

17. The design structure of claim 16, wherein the design structure comprises a netlist, which describes said controller circuit.

18. The design structure of claim 16, wherein the design structure resides on storage medium as a data format used for the exchange of layout data of integrated circuits.

19. The design structure of claim 16, wherein the design structure includes at least one of test data files, characterization data, verification data, or design specifications.

20. The design structure of claim 16, wherein said persistent RPG being changed responsive to the SAS fabric configuration being changed and responsive to the device being physically moved to a different enclosure or slot.

21. The design structure of claim 16, wherein said cable end vital product data (VPD) label used to visually identify the respective storage device; includes said cable end VPD label being a physical attached to a cable connected between SAS ports.

* * * * *